(12) United States Patent
Menon et al.

(10) Patent No.: US 10,733,077 B2
(45) Date of Patent: Aug. 4, 2020

(54) TECHNIQUES FOR MONITORING ERRORS AND SYSTEM PERFORMANCE USING DEBUG TRACE INFORMATION

(71) Applicant: INTEL CORPORATION, Santa Clara, CA (US)

(72) Inventors: Sankaran Menon, Austin, TX (US); Krishna Kumar Ganesan, Hillsboro, OR (US); Rolf Kuehnis, Portland, OR (US); Eija Maarit Hillevi Manninen, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 183 days.

(21) Appl. No.: 15/856,427

(22) Filed: Dec. 28, 2017

(65) Prior Publication Data
US 2019/0042391 A1 Feb. 7, 2019

(51) Int. Cl.
*G06F 11/00* (2006.01)
*G06F 11/36* (2006.01)
*G06F 11/30* (2006.01)
*G06F 11/34* (2006.01)

(52) U.S. Cl.
CPC .......... *G06F 11/364* (2013.01); *G06F 11/302* (2013.01); *G06F 11/3428* (2013.01); *G06F 11/3466* (2013.01); *G06F 11/3636* (2013.01); *G06F 11/3452* (2013.01); *G06F 2201/865* (2013.01)

(58) Field of Classification Search
CPC .. G06F 11/364; G06F 11/302; G06F 11/3428; G06F 11/3466; G06F 11/3636; G06F 11/3452; G06F 11/3419; G06F 11/3476; G06F 11/3612; G06F 11/2284; G06F 2011/2278; G06F 2201/865; G06F 2221/2151
See application file for complete search history.

(56) References Cited

U.S. PATENT DOCUMENTS

| | | | | |
|---|---|---|---|---|
| 7,032,214 B1* | 4/2006 | Rodrigues | ........... | G06F 11/3419 702/186 |
| 8,543,989 B2* | 9/2013 | Inakoshi | ............. | G06F 11/3419 717/130 |
| 8,752,038 B1* | 6/2014 | Newstadt | ............... | G06F 9/4401 713/2 |
| 8,909,768 B1* | 12/2014 | Jaeger | ................. | G06F 11/3495 370/229 |
| 2013/0047039 A1* | 2/2013 | Manes | ................ | G06F 11/3409 714/47.1 |
| 2015/0220420 A1* | 8/2015 | Boneti | ................ | G06F 11/3636 714/37 |
| 2018/0300202 A1* | 10/2018 | Lambert | ............. | G06F 11/1417 |

* cited by examiner

*Primary Examiner* — Marc Duncan

(57) ABSTRACT

Techniques and apparatus for error and performance analysis of a computing device are described. In one embodiment, for example, an apparatus may include at least one memory and logic coupled to the at least one memory, wherein the logic is further to access at least one trace associated with at least one trace source, access timing information associated with the at least one trace, generate a plurality of waypoints for at least one trace, each of the plurality of waypoints comprising a step of at least one trace and a time stamp, and generate at least one performance benchmark log for the at least one trace, the at least one benchmark log comprising a plurality of benchmark waypoints corresponding to the plurality of waypoints.

22 Claims, 13 Drawing Sheets

TECHNIQUES FOR MONITORING ERRORS AND SYSTEM PERFORMANCE USING DEBUG TRACE INFORMATION

TECHNICAL FIELD

Embodiments herein generally relate to computer processors, and more particularly, to generating and analyzing debug trace information to monitor performance of a computing system.

BACKGROUND

Components of conventional computing systems, such as laptops, tablets, smartphones, and other computing devices, are tested and debugged via a dedicated testing interface. For example, debug traces from system circuitry (for instance, integrated circuits (IC) or a system-on-a-chip (SoC)) are typically sent over a Joint Test Action Group (JTAG) interface to an external testing agent. However, such debug tracing functionality is only used by host debug tools during an active debug session by a developer. Accordingly, effective debugging and testing of computing systems in use in the field, particularly to detect minute deviations or degradation over time, are not available.

DETAILED DESCRIPTION

Figure 1:
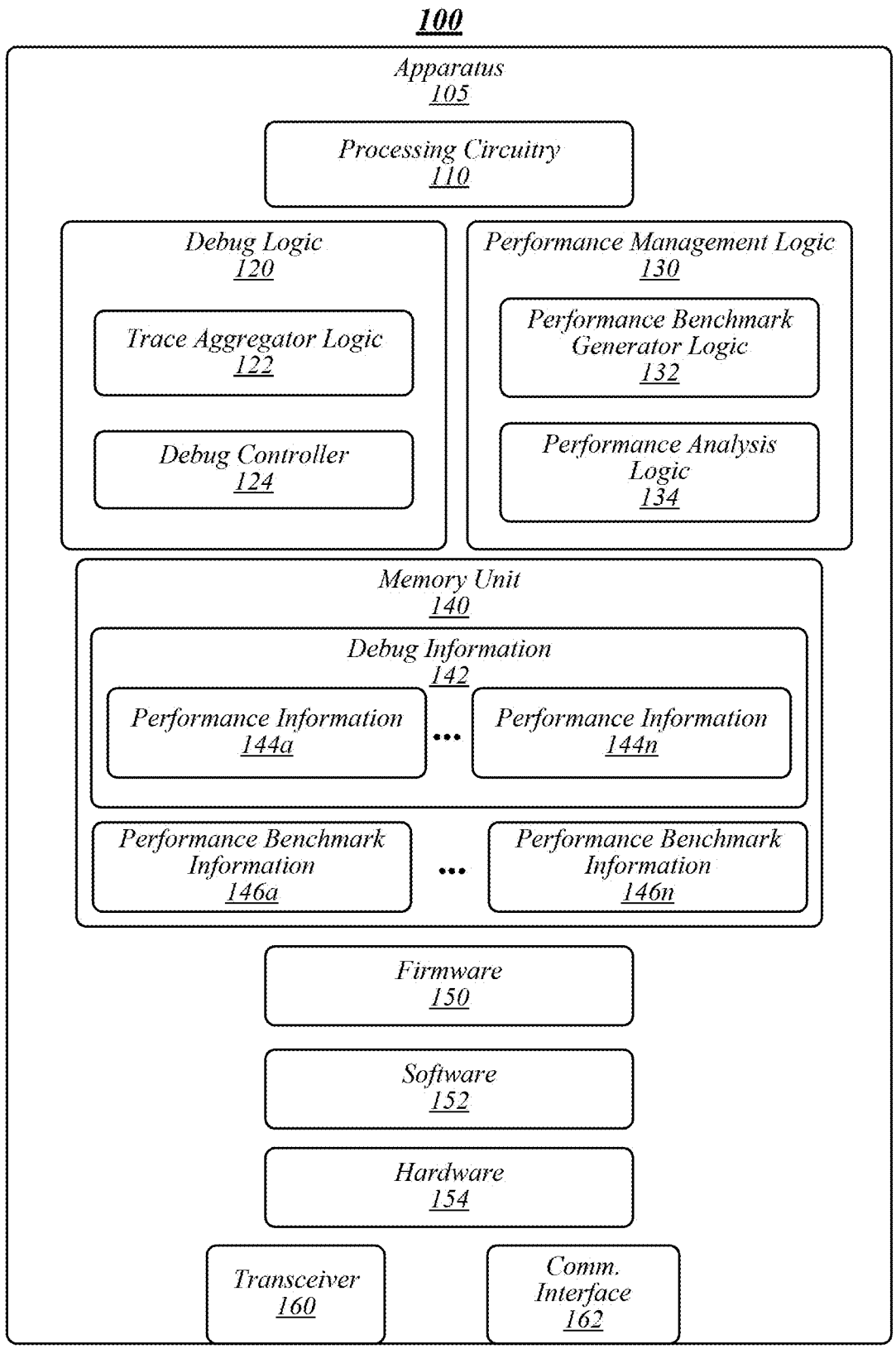
FIG. 1 illustrates an embodiment of a first operating environment.

Various embodiments may be generally directed to techniques for performance analysis of computing device hardware, software, and/or firmware components. In some embodiments, a computing device may include a debug logic operative to manage trace information from a plurality of firmware components. In various embodiments, trace information may generally include, without limitation, trace statements indicating flow of execution processes for various components of a computing device. The trace information may be sent from various sources to a trace collector, such as trace aggregator logic, memory, and/or the like. In some embodiments, time information may be added to the trace information. A non-limiting example of time information may include adding a timestamp to a particular trace statement or process step of trace information. In exemplary embodiments, the process step and corresponding timestamp may operate as a waypoint of a process, such as a boot process, component initialization, process, and/or the like. Each waypoint may be configured as a system execution point for a component.

In some embodiments, a trace management logic may be operative to generate a trace policy for a component, computing device, or other element. In various embodiments, a trace policy may include a standard set of benchmark or reference waypoints relating to a component. For example, a hardware component of a computing device may have an initialization routine upon device startup. The trace management logic may determine a standard set of waypoints for the initialization routine that indicates the standard steps and the timing information for each step (for instance, step 1 occurs at time 0 milliseconds (ms) from routine startup, step 2 occurs after step 1 at 100 ms from routine startup, and so on). The trace policies for various components of the computing device may be stored on or otherwise accessible to the trace management logic during operation of the computing device (including during boot up routines, such as a BIOS boot up routine). In various embodiments, the trace management logic may compare the waypoint information (for instance, waypoints) for a process to the benchmark waypoint information (for example, benchmark waypoints) in a trace policy for the process to determine if there are any deviations (for example, if step 2 for the initialization routine occurs at 200 ms from routine startup). If there are any deviations, the trace management logic may initiate a deviation activity based on the nature of the deviation (for instance, minor, severe, within limits, and/or the like).

According to conventional techniques, tracing processes are only used by debug tools on a connected debug host during an active debug session. In addition, existing testing systems are not able to measure the timing of system processes, such as a system boot sequence, and subsequently analyze saved information to predict system failures, malicious attacks, and/or the like. For example, conventional techniques do not have the capability to measure the timing of system accesses to hardware features at system runtime and then analyze the collected data to predict a system failure, detect a malicious attack, and/or the like. Furthermore, users and system administrators are demanding debug traces even on production systems, such as production BIOS firmware, to collect and investigate potential issues that cannot be tested/invalidated in-field. For example, degradation of a system component over time is not able to be monitored using existing systems during manufacturing or even after a system has gone through multiple validation cycles.

Accordingly, some embodiments provide processes, circuitry, logic, devices, and/or the like operative to implement fast silicon and system firmware debug in production systems to detect, among other things, minute failures, performance deviations, component degradations, and/or the like during system boot-up and/or run-time. In this manner, embodiments may benefit production systems by assisting users, original equipment manufacturers (OEMs), developers, system administrators, and/or the like detect minor performance deviations, component failures (or predicted component failures), that would go undetected using conventional techniques. Some embodiments may facilitate tracking system changes over a period of time, including, without limitation, battery life degradation, problems or slow degradation in hardware, software, and/or firmware, such as a failing module. For instance, a camera failing to initialize at boot or attacks by viruses or hackers changing the boot behavior may be detected using processes according to some embodiments. Accordingly, some embodiments may allow developers, OEMs, and system users to take actions based on previously undetected conditions in a controlled manner.

Performance analysis process according to some embodiments may provide multiple technological advantages over conventional systems. One non-limiting example of a technological advantage may include the ability to compare debug traces of executed processes with a corresponding benchmark trace (this benchmark trace can be the result of one or more artificial intelligence (AI) processes which constantly learns and adapts), to determine deviations in the executed process (for instance, a BIOS routine, a device initialization routine, and/or the like). Another non-limiting example of a technological advantage may include perform intruder detection at every stage of BIOS execution, including, for instance, in a system management mode (SMM) environment. An additional non-limiting example of a technological advantage may include detecting gradual degradation of platform or component performance over time and detecting configuration changes. A further non-limiting example of a technological advantage may include enabling analytical platform manageability with integrity of code execution.

In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner FIG. 1 illustrates an example of an operating environment 100 that may be representative of various embodiments. The operating environment 100 depicted in FIG. 1 may include an apparatus 105 having a processing circuitry 110, a memory unit 140, a transceiver 160, and a communications interface 162. Apparatus 105 may be or may include a computing device, such as a laptop computer, a personal computer (PC), a workstation computer, a tablet, a personal digital assistant (PDA), a smartphone, a phablet, a server, a networking device, and/or the like.

Processing circuitry 110 may include and or may access logic having instructions for performing operations according to some embodiments. Processing circuitry 110 may be communicatively coupled to memory unit 140, transceiver 160, and/or communications interface 162. In various embodiments, processing circuitry 110 may include a CPU or a GPU. In some embodiments, processing circuitry 110 may be implemented on or as a system-on-a-chip (SoC). In some embodiments, processing circuitry 110 may be implemented as a standalone processor die. Processing circuitry 110 may include one or more processing cores, such as 1, 2, 4, 6, 8, 10, 12, or 16 processing cores. Embodiments are not limited in this context. Processing circuitry 110 may include any type of computational element, such as but not limited to, a microprocessor, a microcontroller, a complex instruction set computing (CISC) microprocessor, a reduced instruction set (RISC) microprocessor, a very long instruction word (VLIW) microprocessor, a virtual processor (for example, a VCPU), or any other type of processor or processing circuit. In some embodiments, processing circuitry 110 may be one or more processors in the family of Intel® processors available from Intel® Corporation of Santa Clara, Calif., such as an Intel® Xeon® processor and/or Intel HD or Iris® graphics processors. Although only one processing circuitry 110 is depicted in FIG. 1, apparatus 105 may include a plurality of processing units.

Processing circuitry 110 may include and/or may access various logic for performing processes according to some embodiments. For instance, processing circuitry 110 may include and/or may access debug logic 120 and/or performance management logic 130, and/or instruction analysis logic 124. Although FIG. 1 depicts debug logic 120, performance management logic 130, and/or logic or controllers thereof (for instance, trace aggregator logic 122, debug controller 124, performance benchmark generator logic 132, and/or performance analysis logic 134) as separate logic structures, embodiments are not so limited, as debug logic 120, performance management logic 130, and/or logic or controllers thereof may be configured as one or a plurality of logic structures. In addition, debug logic 120, performance management logic 130, and/or logic or controllers thereof may be implemented in hardware, software, or a combination thereof. As used in this application, the terms "logic," "component," "layer," "system," "circuitry," "decoder," "encoder," and/or "module" are intended to refer to a computer-related entity, either hardware, a combination of hardware and software, software, or software in execution, examples of which are provided by the exemplary computing architecture 1000. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, a controller, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

In some embodiments, debug logic 120, performance management logic 130, and/or logic or controllers thereof may be arranged within processing circuitry 110; however, embodiments are not so limited. For example, debug logic 120, performance management logic 130, and/or logic or controllers thereof may be located within an accelerator, a processor core, an interface, an individual processor die, and/or the like and may include other components, such as software, firmware, circuitry and/or the like.

Memory unit 140 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 140 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

In various embodiments, memory unit 140 may store debug information 142, performance benchmark information 144a-n, and/or other information used and/or generated by apparatus 105 and components thereof. Apparatus 105 may include firmware 150, software 152, and/or hardware 154. In general, firmware 150 may include computer programs, code, applications, software, instructions, and/or the like for controlling various components of apparatus 105. In some embodiments, firmware 150 may include a BIOS process, such as a BIOS boot process for apparatus 105. Software 152 may include various software applications that may be executed on apparatus 105. Hardware 154 may include various types of hardware components of apparatus, including I/O devices, cameras, and/or the like.

In some embodiments, debug logic 120 may manage or otherwise debug processes for firmware 150, software, and/or hardware 154 debug sources. Debug processes according to some embodiments may include debug sources generating traces. In various embodiments, traces may include information indicating a flow of execution processes, hardware events, software events, performance information, performance counters, and/or the like. Debug logic 120 may include or be operatively coupled to a trace collector, such as a trace aggregator 122. In some embodiments, for example, in which processing circuitry 110 includes Intel® processing technology, trace aggregator 122 may include or may be implemented as or similar to an Intel® Trace Hub (TH) logic. Although a trace aggregator may be used as an example herein, embodiments are not so limited as any controller, element, logic, component, and/or the like capable of operating to collect or aggregate traces according to some embodiments is contemplated herein. For example, standard interconnect/fabric may be used instead of a dedicated trace aggregator in which, for instance, traces may be written via functional paths to a collector or sink, such as a memory. Accordingly, in some embodiments, a trace aggregator may not be included in apparatus 105 and/or may not be used by debug logic 120. In such embodiments, the trace collector may include a memory unit. For example, debug logic may implement debug processes by writing to memory (for example, SRAM) and perform comparison processes using a compute engine, which would not require special hardware.

Figure 2:
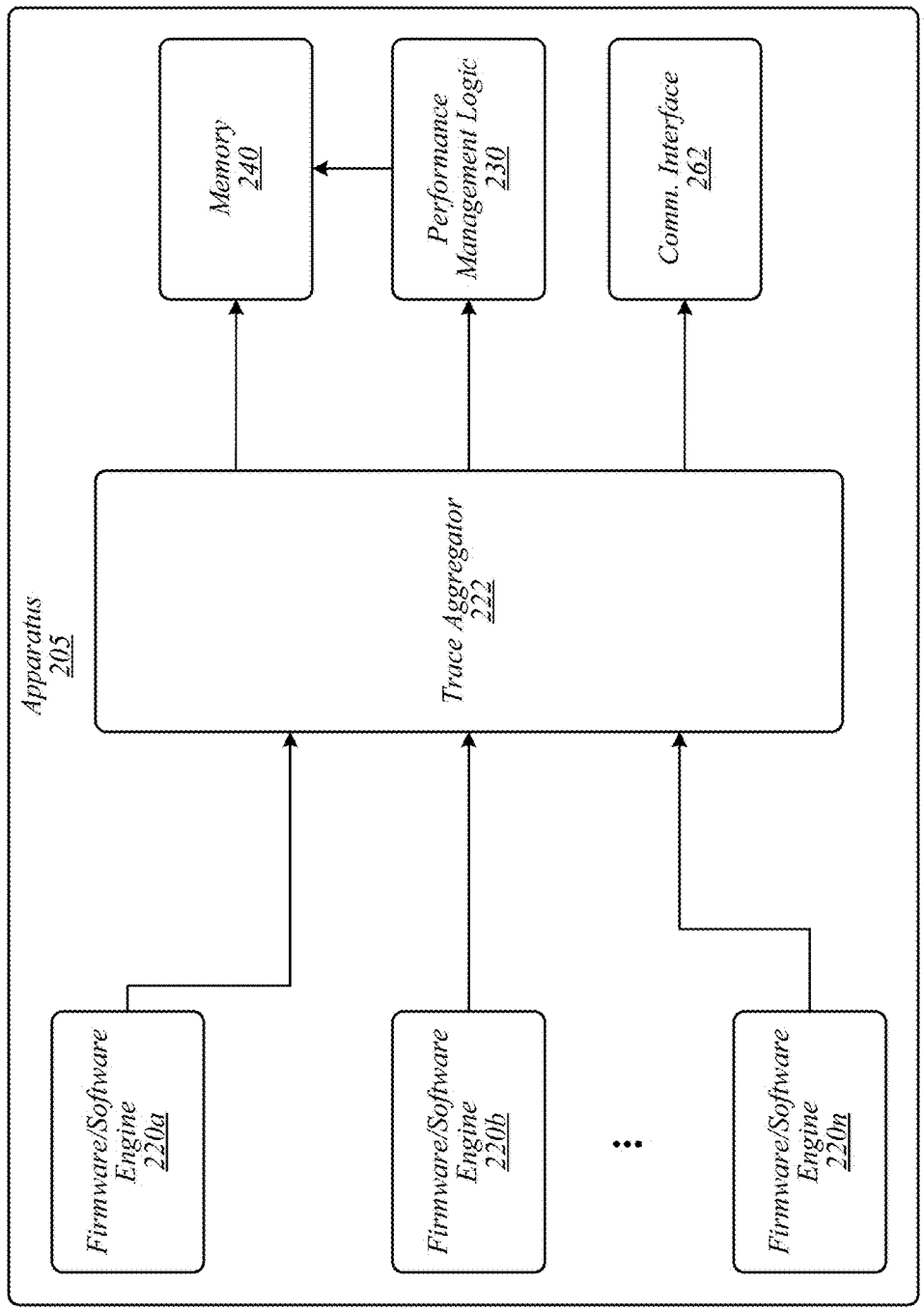
FIG. 2 illustrates an embodiment of a second operating environment.

Referring to FIG. 2, therein is illustrated an example of an operating environment 200 that may be representative of various embodiments. The operating environment 200 depicted in FIG. 1 may include an apparatus 205 having trace sources 220a-n, such as one or more firmware or software engines. Trace sources 220a-n may provide traces to trace aggregator 222. In some embodiments, trace aggregator 222 may generally be operative to collect all or at least a portion of the traces (or trace messages of a trace) generated within a computing device, such as apparatus 105 (as opposed to multiplexing traces in conventional systems). In various embodiments, trace aggregator 222 may be operative to associate time information with the collected traces (or trace messages). For example, in some embodiments, trace aggregator 222 may associate a time stamp with a trace and/or a portion of a trace (such as a step in an execution flow). In some embodiments, trace aggregator 222 may implement time stamping or universal time stamping to collected traces.

The traces collected by trace aggregator 222 may be stored in a memory 240 or transmitted via a communications interface 262, such as universal serial bus (USB), MIPI-HTI, a wireless communications interface (for example, Bluetooth, Wi-Fi, and/or the like), and/or the like. In various embodiments, the traces may be stored or provided in a file, catalog, and/or the like along with the time information. In some embodiments, a performance management logic 230 may access the traces directly from trace aggregator 222 or as stored in memory 240.

Returning to FIG. 1, debug logic 120 may include a debug controller 124 operative to control various aspects of debug processes of apparatus 105. For example, trace sources may start and stop traces responsive to instructions from debug controller 124. In another example, debug controller 124 may instruct trace sources to provide traces to trace aggregator 122. In various embodiments, debug controller 124 may be operative to facilitate traces captured by trace aggregator 122 to be sent from trace aggregator 122 to memory unit 140 and/or communications interface 162.

Debug logic 120 may be operative to generate or receive debug information 142 stored, for example, in memory unit 140. Debug information 142 may include information generated as a result of debug processes of trace sources, such as firmware 150, software 152, and/or hardware 154 of apparatus 105. In some embodiments, debug information 142 may include executed traces. In various embodiments, debug information 142 may include executed traces and corresponding time stamp information (for instance, steps of a traced process flow and a time stamp for at least a portion of the steps). In various embodiments, debug information 142 may include waypoints indicating demarcation points and/or system execution points in a process flow trace. A waypoint may include a process step and a corresponding time stamp. For example, debug information 142 may include a boot log for a device having a first waypoint that Module M1 loaded at time $t_1$, Module M2 loaded at time $t_2$, and so on. In some embodiments, the time information may include a time stamp of absolute time (for instance, an official reference time). In other embodiments, time information may include a time stamp of relative time (for instance, a duration from an event). In some embodiments, debug information 142 may include trace logs formatted or saved in a catalog format (for instance, in an internal memory buffer) along with a dictionary file (for instance, included in system binary files).

Apparatus 105 may include performance management logic 130 operative to determine the performance of various aspects of apparatus 105. In some embodiments, performance management logic 130 may include performance benchmark generator logic 132 operative to generate performance benchmark information 146a-n. In various embodiments, performance benchmark information 146a-n may include expected outcomes of traces for trace sources. Performance benchmark information 146a-n may include a series of waypoints for a trace, such as a BIOS startup routine. For example, performance benchmark information 146a may include waypoints (including execution steps and corresponding expected time stamps) for a driver initialization routine. Performance benchmark information 146a may include an entry for each expected process step and a corresponding time stamp of when the step is expected to occur. For example, performance benchmark information 146a may include a first entry of "Execute Module 1 at time 0 ms," a second entry of "Execute Module 2 at time 200 ms," an entry of "Execute Module 3 at time 500 ms," and so on. Accordingly, the benchmark trace for the driver initialization routine indicates that Module 2 should execute 200 ms after Module 1 and that Module 3 should execute 300 ms after Module 2 (using relative time from execution of Module 1).

Performance benchmark information 146a-n may be generated based on various processes. For example, a routine, such as a driver initialization routine, may be executed a threshold number of times and the waypoints associated with the driver initialization routine trace analyzed to determine the corresponding performance benchmark information 146a-n (for example, by performing statistical analysis of the time stamps, such as averaging the time stamps). In another example, at least a portion of the waypoints may be specified by a developer, for instance, hard-coded or at least partially hard-coded into the system. In a further example, at least a portion of performance benchmark information 146a-n may include a manufacturer log stored, for example, in a carved-out portion of memory unit 140. In still a further example, apparatus 105 may provide a user interface for performance management logic 130 that may allow a user to initiate generation of performance benchmark information 146a-n. For instance, a user may use the interface to allow performance management logic 130 to learn the waypoints associated with one or more process flows, such as a boot flow. In another example, performance management logic 130 may be operative to monitor and learn the waypoints associated with one or more process flows, for instance, using artificial intelligence (AI), for instance, based on run-time and/or historical data. In some embodiments, performance management logic 130 may automatically detect the status of apparatus 105 and use processed to generate and/or adjust performance benchmark information 146a-n. In various embodiments, benchmark information 146a-n, such as absolute benchmark limits, may be defined/hard coded. In some embodiments, the benchmark information 146a-n may be determined on first boot of the apparatus 105, the system can subsequently adjust the benchmark figures with product specific numbers. In exemplary embodiments, the benchmark information 146a-n may be determined on consecutive boots, for example, the system may learn and adjust the figures (such as via AI processes).

In various embodiments, performance benchmark information 146a-n may include files, data structures, databases, logs, elements, and/or the like of benchmark waypoints for components of apparatus 105. For example, a first benchmark performance file may include waypoints associated with a BIOS startup routine or boot sequence. In another example, a second benchmark performance file may include waypoints associated with a camera device initialization routine.

In various embodiments, performance management logic 130 may detect configuration information or other changes to configuration information in apparatus 105 and/or components thereof. In exemplary embodiments, configuration information may include the configuration of apparatus 105 components, such as firmware 150, software 152, and/or hardware 154. In some embodiments, performance management logic 130 may be operative to detect environmental context information associated with apparatus 105 and/or components thereof. Environmental context information may include information such as temperature, battery level, processor utilization, memory utilization, and/or the like that may affect a process flow. The configuration information and/or the environmental information may affect the debug information of process flow. For example, a driver initialization routine may have different waypoints under different environmental and/or configuration conditions as indicated by the environmental information and/or configuration information. Accordingly, performance management logic 130 may adjust and/or create different performance benchmark information 146a-n based on the environmental information and/or configuration information. For example, performance management logic 130 may include a first performance benchmark for a driver initialization trace if processor utilization is below a first threshold, a second performance benchmark if processor utilization is below a second threshold, and so on. In another example, the configuration information may indicate that software associated with a driver initialization trace has been updated. Accordingly, performance management logic 130 may learn the modified driver initialization process flow and modify an associated performance benchmark. For instance, if new firmware 150 is installed, performance management logic 130 may operate to adjust values of affected performance benchmarks on a subsequent boot. In some embodiments, performance management logic 130 may perform filtering processes on multiple performance benchmarks to adjust a performance benchmark, such as applying a Kalman filter. Embodiments are not limited in this context.

In various embodiments, performance management logic 130 may include or may access performance analysis logic 134. In general, performance analysis logic 134 may be operative to compare actual system performance against performance benchmarks to determine whether there are any performance deviations. Debug information 142 may include performance information 144a-n that includes waypoints associated with traces collected by trace aggregator logic 122. Performance information 144a-n may include a log file of waypoints associated with a trace, such as for a driver initialization trace. Performance benchmark information 146a-n may include a benchmark log file having benchmark waypoints that corresponds with the log file. The benchmark log file may include expected waypoints for the driver initialization trace. The log file may include waypoints generated as a result of executing the driver initialization trace. Performance analysis logic 134 may compare the log file with the benchmark log file to determine whether there are any deviations between the actual waypoints resulting from executing the driver initialization trace and the expected benchmark waypoints.

In some embodiments, performance analysis logic 134 may initiate a deviation action responsive to determining that there is a deviation between the performance information 144a-n and the corresponding performance benchmark information 146a-n. For example, step 3 of a benchmark log file may include a waypoint for execution of Module M3 at time 1000 ms, while step 3 of a corresponding log file resulting from actually executing a trace may have a waypoint of Module M3 at a time of 1500 ms. Accordingly, there is a 500 ms deviation between the expected step 3 waypoint and the actual step 3 waypoint. The resulting deviation action may be dependent upon an analysis of the deviation. For example, a severe deviation threshold may be used to determine whether the deviation is severe (for instance, if the deviation is greater than 200 ms, then the deviation is severe). In another example, whether a deviation is severe may depend on the particular deviating step. For example, a deviation of Module M1 may have a threshold of a 200 ms deviation, while a deviation of Module M2 may have a threshold of 500 ms. Non-limiting examples of deviation actions may include generating an alert (for instance, an OS-based message predicting breakdown of a hardware component), triggering a security system (for instance, for malware), transmitting a message to a vendor or developer, and/or the like.

Figure 3:
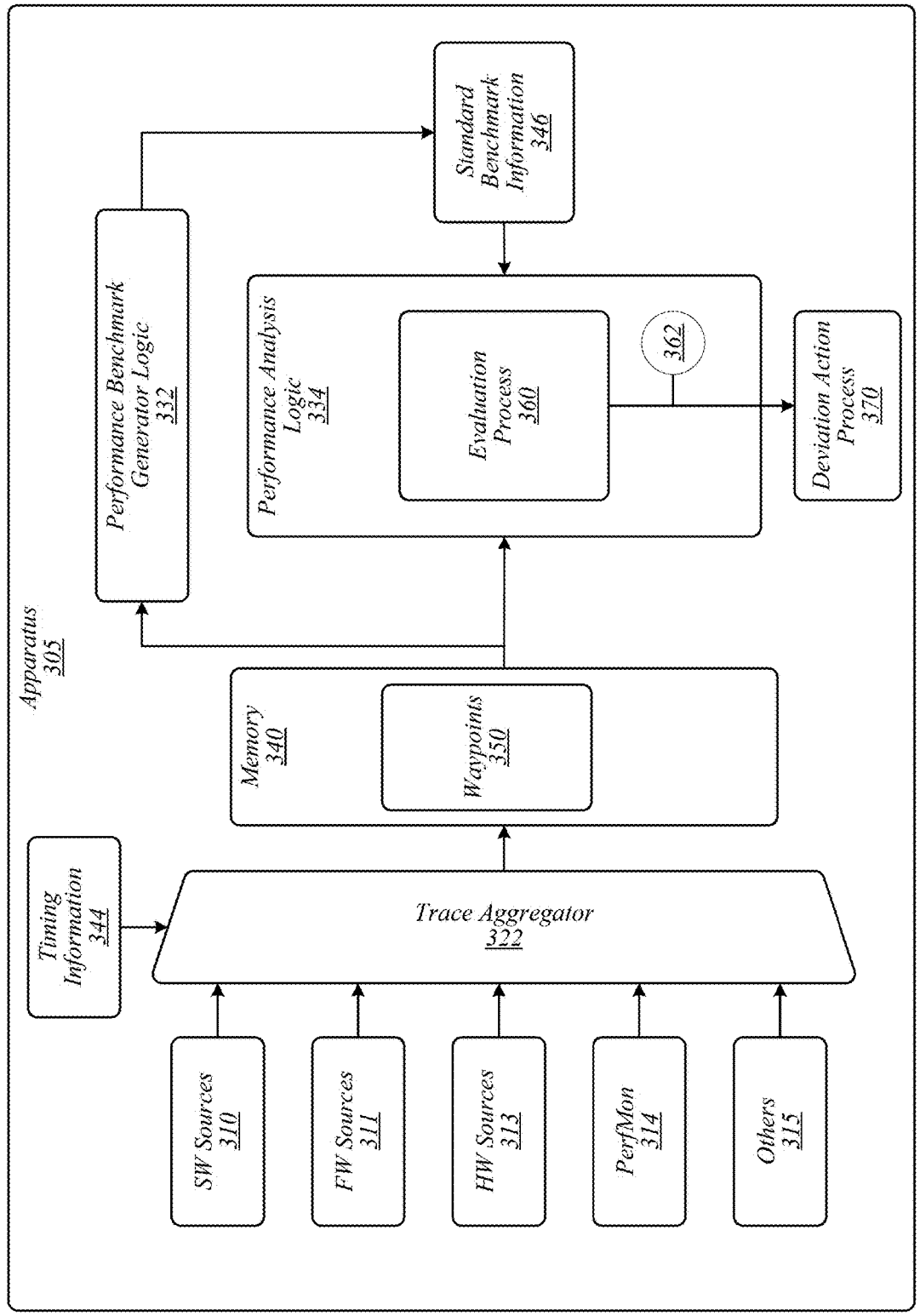
FIG. 3 illustrates an embodiment of a third operating environment.

FIG. 3 illustrates an example of an operating environment 300 that may be representative of various embodiments. The operating environment 300 depicted in FIG. 3 includes an apparatus 305 having a trace aggregator 322 operative to receive traces from a plurality of trace sources 310-315. Non-limiting examples of trace sources may include software sources 310, firmware sources 311, hardware sources 313 performance monitor (for instance, a perfmon utility or tool) sources 314, and other sources 315 known to those having skill in the art. In various embodiments, trace aggregator 322 may receive or generate timing information 344. The timing information 344 may be integrated with the traces to generate waypoints 350, which may be stored in a memory 340 of apparatus 305.

The waypoints 350 may be accessed by performance benchmark generator logic 322 to generate standard benchmark information 346 according to some embodiments. In some embodiments, standard benchmark information 346 may include an abstract benchmark process (see, for example, FIG. 6). Performance analysis logic may access waypoints 350 (for example, as performance information 144a-n) of traces from one or more of trace sources 310-311 and perform an evaluation process 360 to compare the waypoints 350 (for example, as performance information 144a-n) to the standard benchmark information 346. The performance analysis logic may perform a deviation action process responsive to a deviation 362 between the waypoints 350 and the performance benchmark information 346 depending, for example, on the severity of deviation 362. For example, performance analysis logic 334 cause an OS of apparatus 305 to display a warning message on a display (not shown) of apparatus 305.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 4:
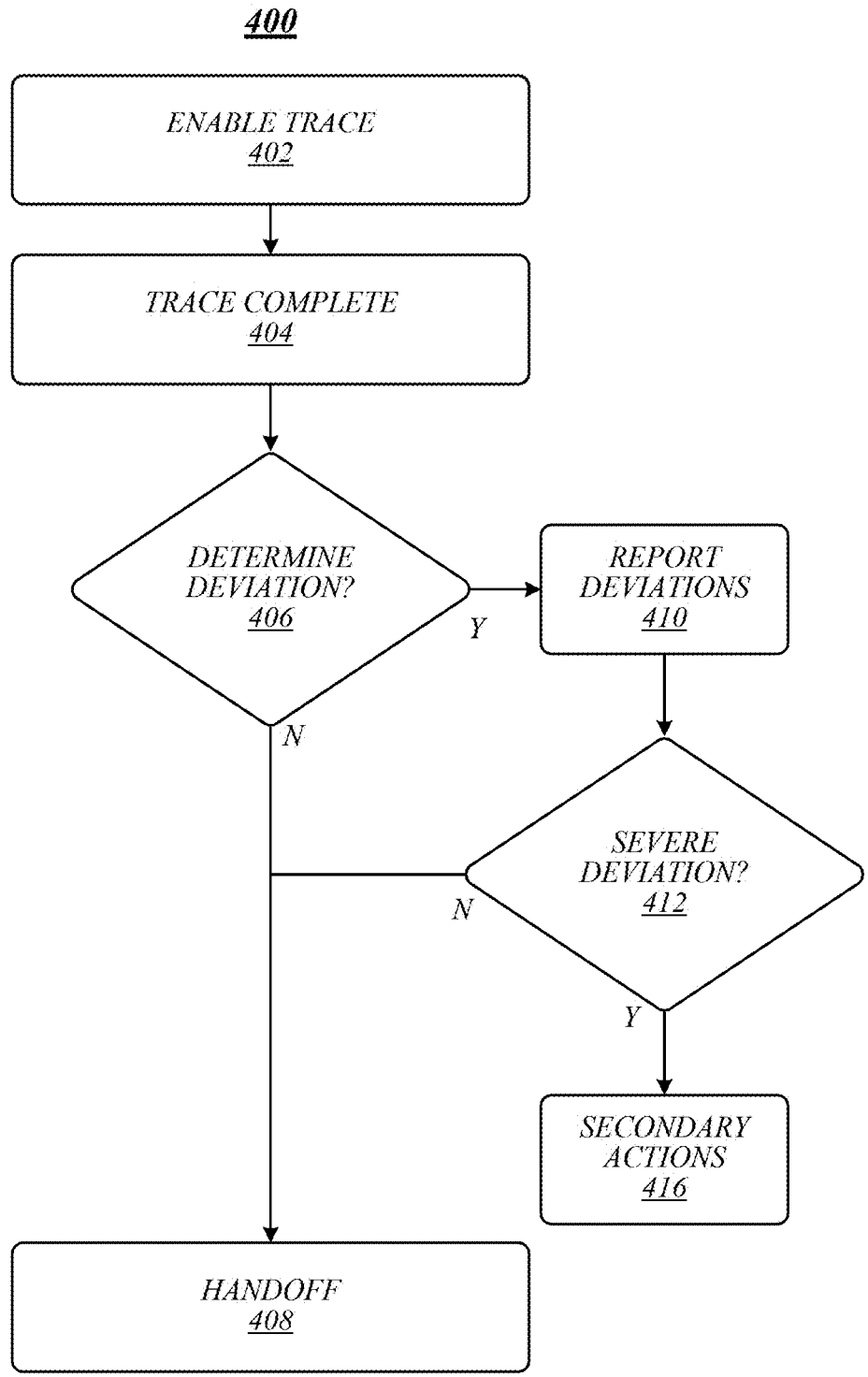
FIG. 4 illustrates an embodiment of a first logic flow.

FIG. 4 illustrates an embodiment of a logic flow 400. Logic flow 400 may be representative of some or all of the operations executed by one or more embodiments described herein, such as apparatus 105, 205, and/or 305. In some embodiments, logic flow 400 may be representative of some or all of the operations of a performance analysis process.

Logic flow 400 may enable a trace at block 402, or, in some embodiments, the trace maybe be enabled by default upon power-up. For example, debug logic 120 may enable a pre-boot trace for apparatus 105. In some embodiments, for instance, logic flow blocks 402, 404, 406, and 412 may be part of a pre-boot performance analysis process. At block 404, logic flow 400 may determine that the trace is complete. For example, a boot process for apparatus 105 may be completed and performance information 144a-n generated for the boot process. Logic flow 400 may determine whether there is a deviation at block 406. For example, performance analysis logic 134 may compare waypoints of performance information 144a-n for the boot process to corresponding benchmark waypoints of performance benchmark information 146a-n for the boot process and determine whether there are any waypoint deviations. In some embodiments, a deviation between waypoints must be above a deviation threshold in order to trigger a finding of a deviation. In various embodiments, the deviation threshold may be based on a percentage (for example, deviating by X %), an absolute value (for example, a deviation of greater than X (20 ms for a ms-based time waypoint), and/or the like.

Logic flow 400 may report the deviation at block 410. For instance, performance analysis logic 134 may generate a report for the deviation that may be used by firmware, OS, etc. In some embodiments, firmware, OS, etc. may use the reports to collect statistics and make decisions based on appropriate analysis (for instance, do not load camera driver if there are any camera hardware initialization issues). At block 412, logic flow 400 may determine whether the deviation is a severe (or high-risk) deviation. For example, if the deviation is outside of a severe deviation threshold and/or involves a critical waypoint, performance analysis logic 134 may determine that the deviation is a severe deviation. If logic flow 400 determines that the deviation is not a severe deviation at block 412, logic flow 400 may handoff 408 operation to a subsequent routine, logic, and/or the like. For example, for a boot process, logic flow 400 may handoff control to the OS. If logic flow 400 determines that the deviation is a severe deviation at block 412, logic flow 400 may initiate a secondary action at block 416. For example, performance analysis logic 134 may trigger an alarm or shutdown (or prevent completion of a startup routine) of a system or component thereof.

FIGS. 5A-D illustrates various embodiments of process flow 500. Process flow 500 may be representative of some or all of the operations executed by one or more embodiments described herein, such as apparatus 105, 205, and/or 305. In some embodiments, process flow 500 depicted in FIGS. 5A-D may be representative of some or all of the operations of a performance analysis process associated with a power-on boot process under various conditions.

Figure 5A:
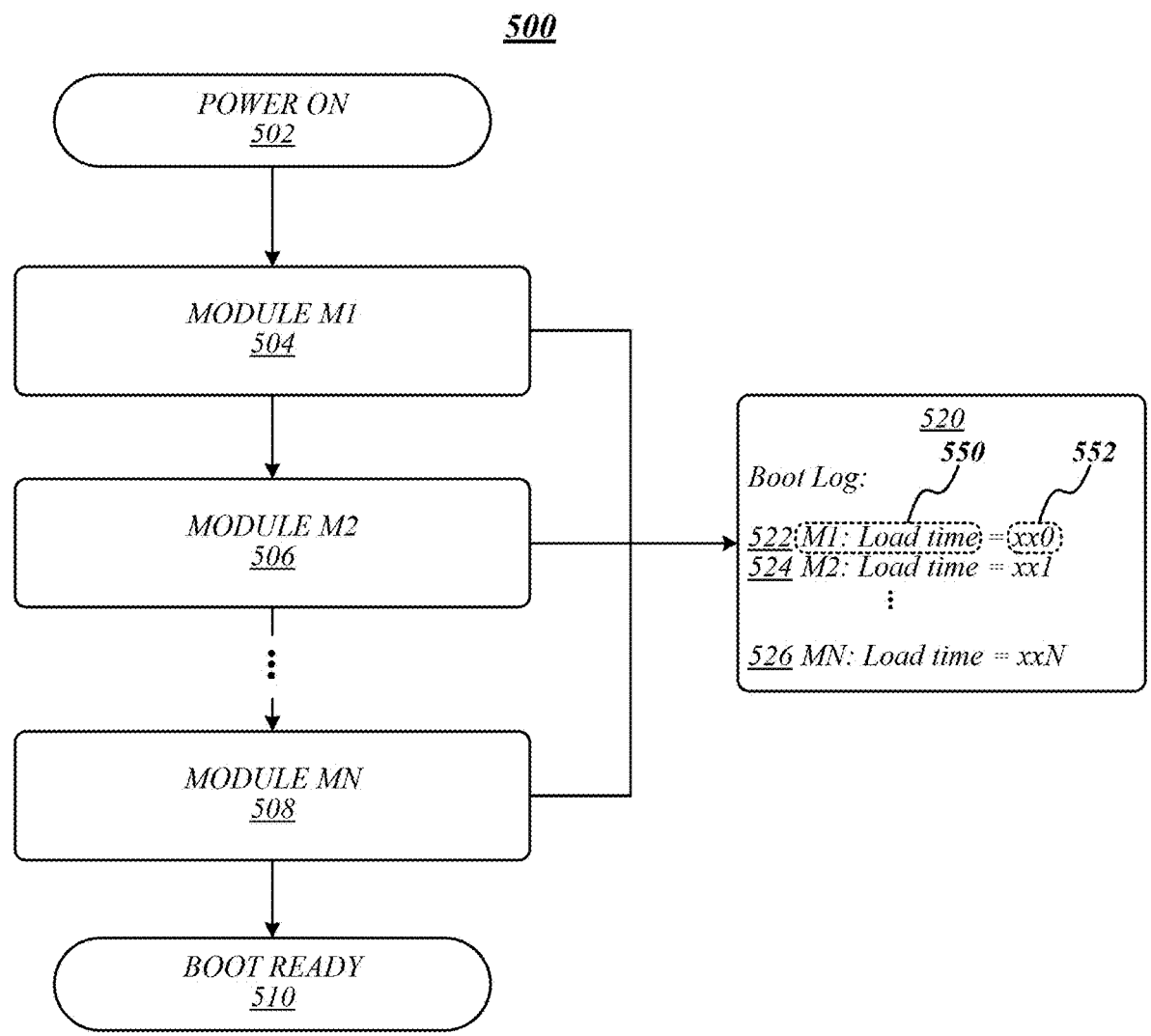
FIGS. 5A-D illustrates various embodiments of a process flow.

As shown in FIG. 5A, process flow 500 may be initiated when an apparatus is powered on at block 502. For example, apparatus 105 may be powered on and initiate a boot process, such as a BIOS start up routine. At block 504, process flow 500 may execute Module M1 as part of the boot process. For example, Module M1 may be a first step of a module execution routine that includes Module M1-MN to perform the boot process. A waypoint 522 for execution of Module M1 may be added to performance log (for instance, a boot log) 520. As depicted in FIG. 5A, each waypoint 522 may include a process element 550 (for instance, execution of a module or other step) and a time element 552 (for instance, a time stamp associated with the process element, such as start time of the process element, completion time of the process element, and/or the like). In some embodiments, a trace aggregator may automatically time stamp all received trace messages to generate waypoints.

At block 506, process flow 500 may execute Module M2, causing waypoint 524 to be added to boot log 520. At block 508, process flow 500 may execute Module MN (for instance, the final module), causing waypoint 526 to be added to boot log 520. After execution of Module MN, process flow 500 may be boot ready at block 510. As depicted in FIG. 5A, execution of the boot process of process flow 500 may generate corresponding performance information, for example, in the form of boot log 520. In various embodiments, boot log 520 may be stored in memory and/or compared with benchmark performance information for the boot process (for instance, a manufacturer boot log).

For example, for a system operating using an Intel® based processor, may have a performance information log that includes different waypoints reached at different times, such as "loading recovery capsule at 1252.265 ms," "resetting keyboard at 2324.614 ms," "detecting presence of keyboard at 2427.617 ms," and so on. If a keyboard controller takes more time for self-testing then expected, the "detecting presence of keyboard" waypoint will be pushed out. The performance analysis monitor may detect this deviation and initiate a deviation action, such as providing information to the OS/user about possible intrusion, such as via a software/firmware keyboard controller attack or due to a defective keyboard. In some embodiments, the performance analysis logic or OS may perform further analysis processed to determine the nature of the deviation, such as whether the delay in "detecting presence of keyboard" is due to a software/firmware controller attack, a hardware failure, and/or the like.

Figure 5B:
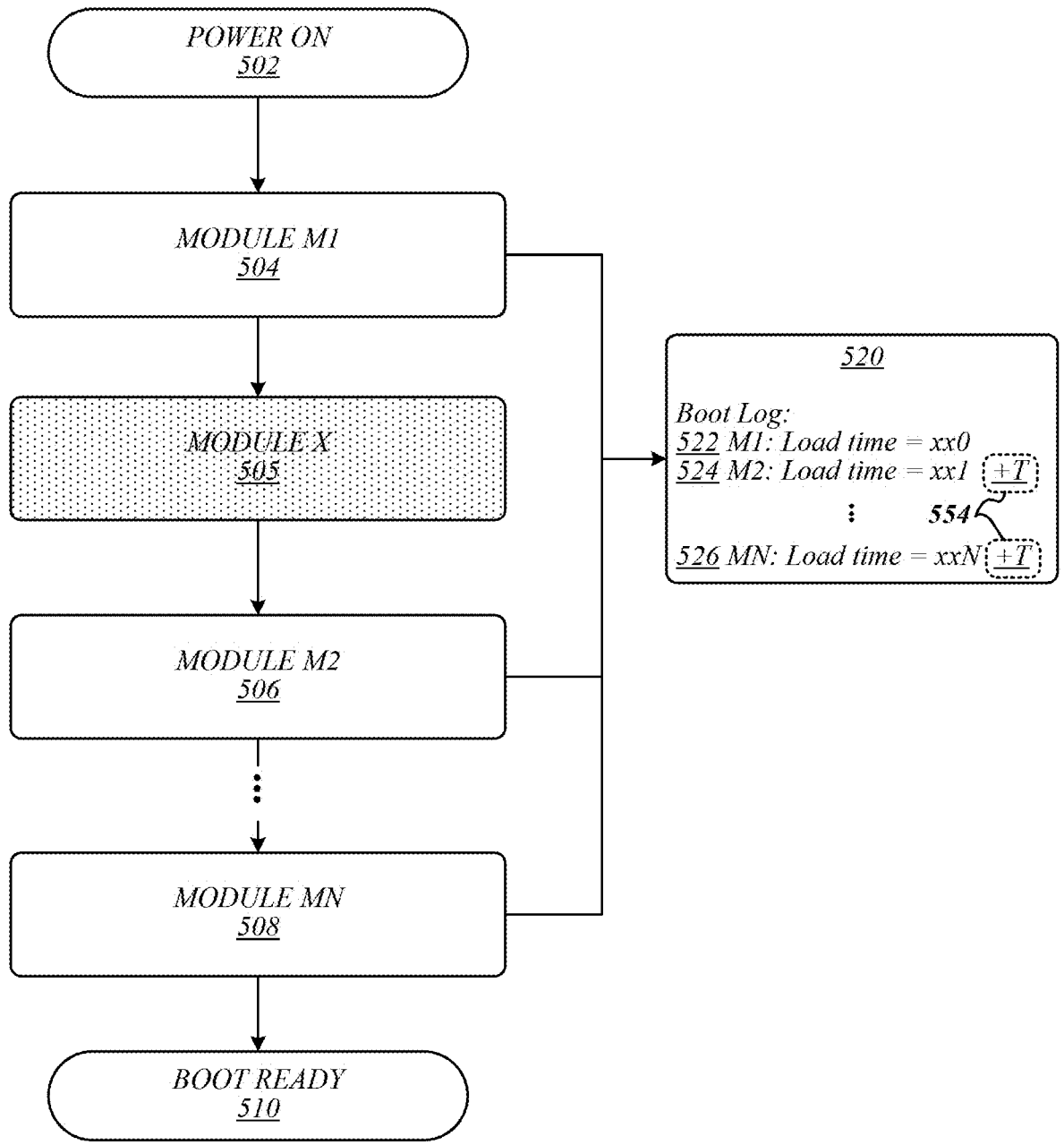

Referring to FIG. 5B, block 505 has been added to process flow 500, which is unrecognized code that is not included as a waypoint in boot log 520. The duration for Module X of block 505 to execute and pass control to Module M2 is time T 554, which is added to the time stamp for Module M2 waypoint 524 and all subsequent waypoints. In this manner, deviations from standard waypoints may be detected, which may be vital, for example, for detecting code injected from outside a platform. In some embodiments, processes (such as firmware) may make decisions based on the deviation, such as stopping execution of a process to prevent further exploitation and/or reporting deviations to the OS and/or a vendor for further action.

Figure 5C:
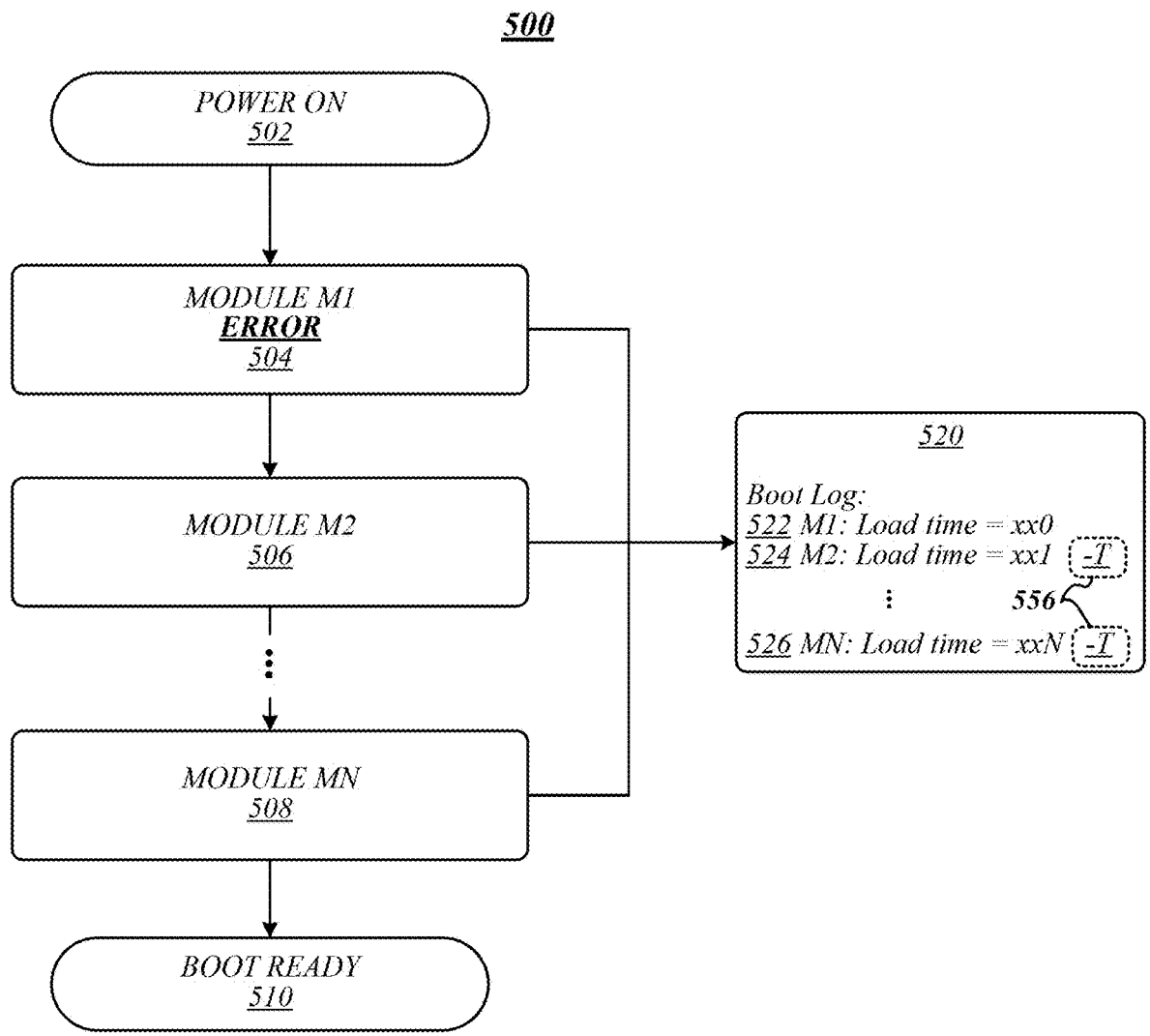

In FIG. 5C, an error has occurred during execution of Module M1 at block 504, for example, due to file corruption. Accordingly, execution of Module M1 has aborted or failed to load, thereby reducing or completely eliminating the run time for Module M1. Accordingly, a duration 556 will be subtracted from the time stamps for the Module M2 waypoint 524. Alternatively, failure of a module may cause an increase in the runtime of the module (for example, until the module times out), such that a duration may be added to the waypoints following the failed module.

The processes to detect deviations as depicted in FIGS. 5B and 5C may be used in conditions of varying granularity. For example, for Unified Extensible Firmware Interface (UEFI) BIOS, deviation detection processes according to some embodiments may be implemented at each driver dispatch. For instance, to compare and decide at each security phase (SEC), pre-EFI (PEI), driver execution environment (DXE), boot device selection (BDS) driver level, UEFI phase (SEC/PEI/DXE/BDS), and/or the like. In another example, for a firmware support package (FSP), compare and decide may occur at each FSP API completion (for instance, TempRamInit (FSP-T), MemoryInit (FSP-M), SiliconInit (FSP-S), and/or the like). Embodiments are not limited in this context.

Figure 5D:
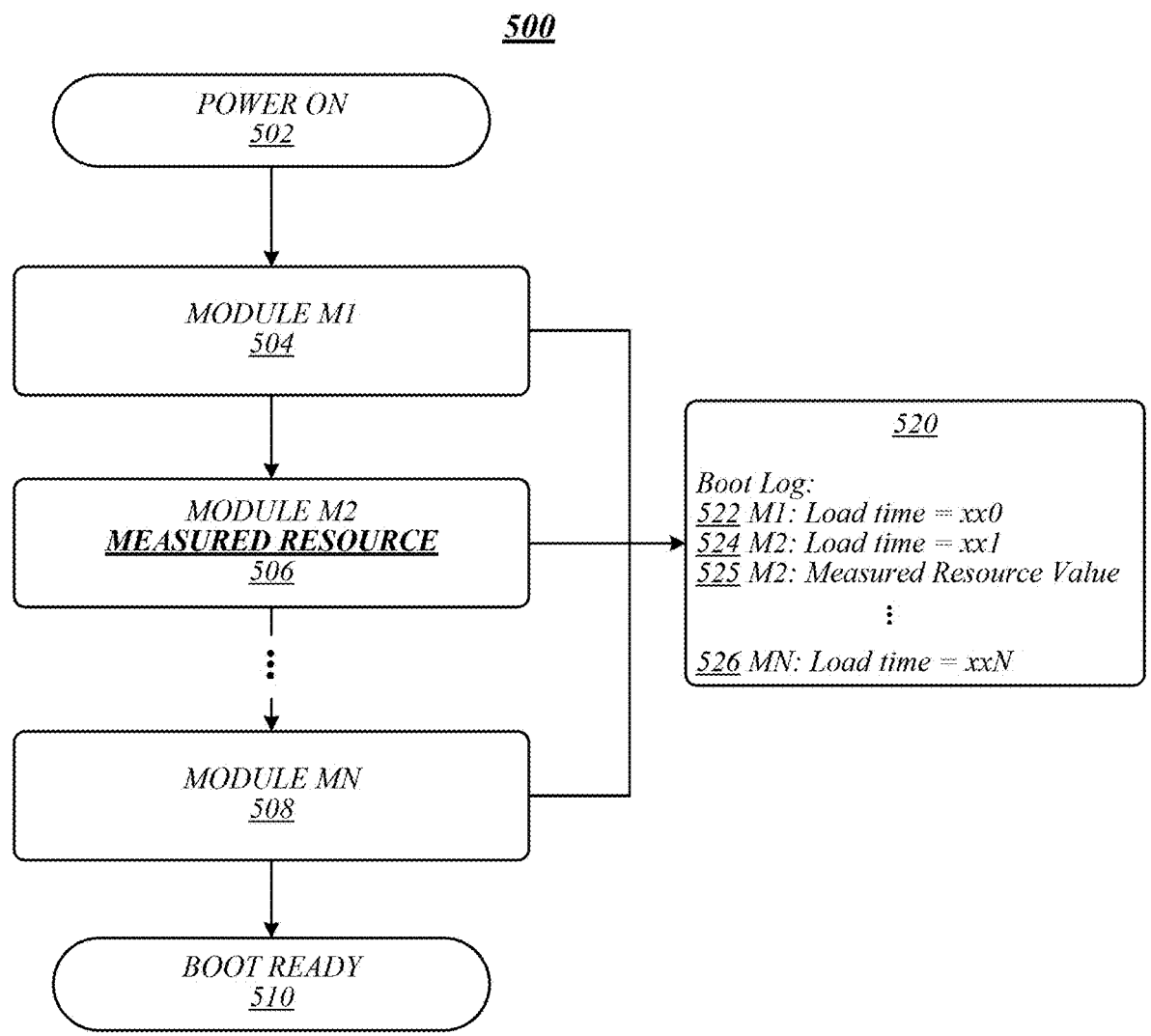

Referring to FIG. 5D, a measured resource has been added to block 506 during execution of Module M2. In some embodiments, a measured resource may be variable that may be measured and monitored or tracked and included as a boot log measured resource value or output 525. In various embodiments, the boot log measured variable output may be included as part of a corresponding benchmark performance log. For example, a measured resource may include a variable in which changes over time may be detected, for instance, to indicate a deviation, such as due to degradation of a component over time. In one example, the measured resource may be a perfmon measurement that may be measured may be used as a measured resource variable, which may be the payload or measured resource output 525 of a waypoint. In various embodiments, when a critical degradation limit or threshold has been reached based on the measured resource output, performance analysis logic may initiate a deviation action according to some embodiments. For example, degradation of system performance may cause the measured resource (for instance, perfmon variable) to change, which in turn may be detected by the performance management logic and an alert may be generated for the OS. In this manner, performance analysis processes according to some embodiments are able to provide system IP health on every boot and monitor its performance at all times.

Figure 6:
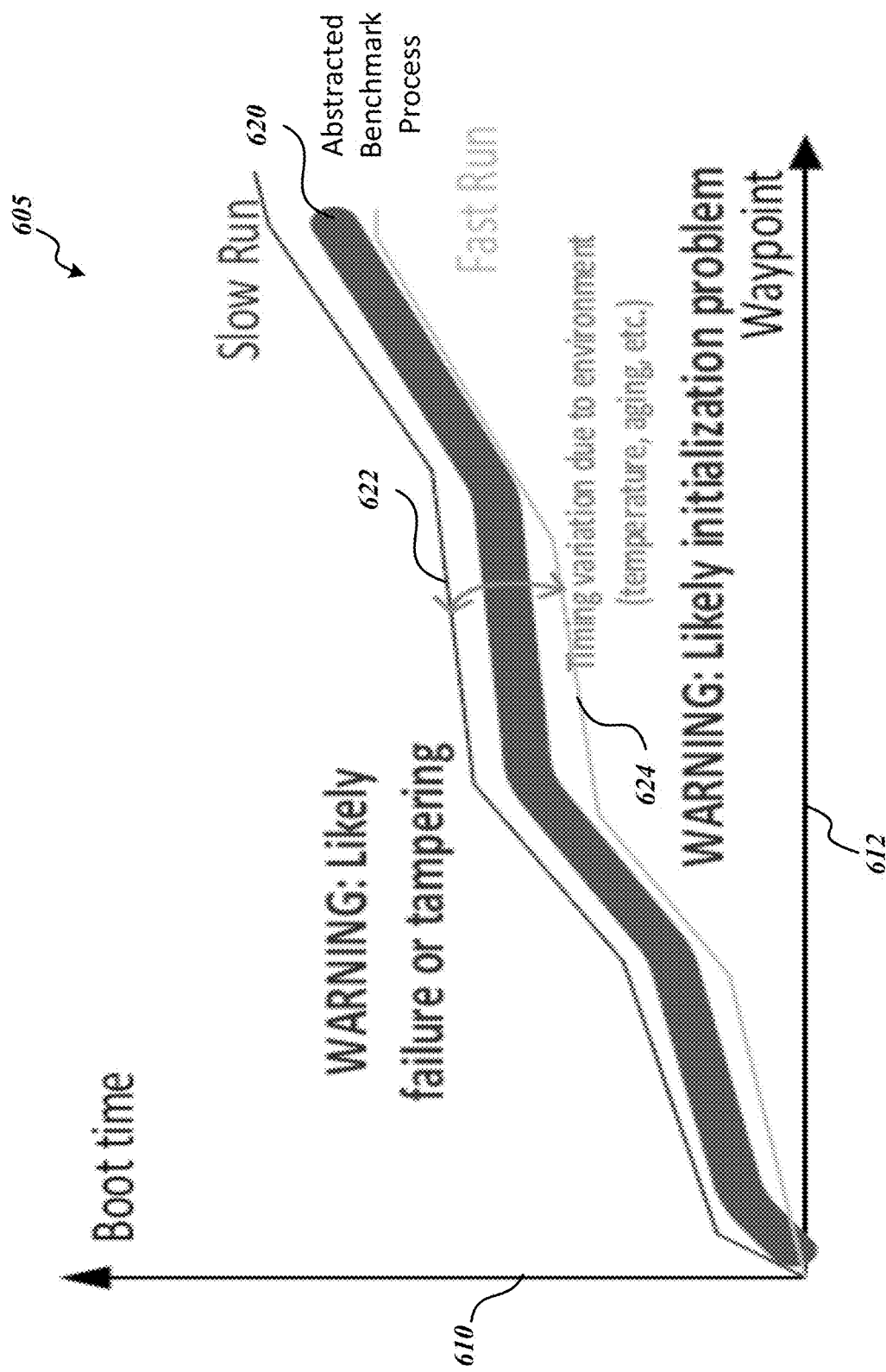
FIG. 6 depicts a graphical representation of filtering of waypoint timing according to some embodiments.

FIG. 6 depicts a graphical representation of filtering of waypoint timing according to some embodiments. Process flow timing for various processes, such as a boot start up process, may vary over time due to various conditions, such as environmental and or configuration conditions (for instance, as indicated by environmental context information and/or configuration context information). Accordingly, deviations from benchmark values may be variable, as opposed to being fixed. Accordingly, in some embodiments, a plurality of performance benchmark parameters and/or files may be stored and one or more filters may be applied to generate an abstracted benchmark process, flow, or file. In various embodiments, filtering may include adaptive digital filtering including, without limitation, a Kalman filter.

As depicted in FIG. 6, a graph 605 of an abstracted benchmark process 620 may be generated on a boot time vs. waypoint basis. Timing variations according to various environmental and/or configuration contexts may be used to generate one or more deviating or "outlier" processes. For example, a slow outlier process 622 may be generated that estimates a slower process with respect to an abstracted benchmark process 620. In another example, a fast outlier process 624 may be generated that estimates a faster process with respect to an abstracted benchmark process 620.

In some embodiments, performance analysis logic may determine the variance distance of a measured reading from the abstracted benchmark process. In various embodiments, an outlier process may be used to determine the variance distance. In exemplary embodiments, the outlier process may use an outlier algorithm with z-score. In some embodiments, the outlier algorithm with z-score may be $Z_i=(Y^i-\overline{Y})/s$, where $\overline{Y}$ is the sample mean and $s$ is the sample standard deviation. Data may be in units of how may standard deviations the sample is from the mean. In some embodiments, a z-score may be determined experimentally (for instance, based on a plurality of experimental runs), and compute the z-score to obtain confidence in the distance of the measured data with respect to the abstracted benchmark process. The z-score may be used on systems to identify various issues based on comparing the outlier z-score with the abstracted benchmark process.

According to some embodiments, slow outlier process 622 and fast outlier process 624 may operate as acceptable deviation lower and upper boundaries, respectively. If a performance analysis indicates that a process or portion thereof is slower than the slow outlier process 622 (for instance, higher on the boot time dimension 210), the performance analysis logic may generate a warning. In some embodiments, the warning generated responsive to a process or portion thereof being slower than the slow outlier process 622 or portion thereof may indicate that there is likely a failure or tampering (for instance, causing the process or portion thereof to run longer or slower). Alternatively, if a performance analysis indicates that a process or portion thereof is faster than the fast outlier process 624 (for instance, lower on the boot time dimension 210), the performance analysis logic may generate a warning. In some embodiments, the warning generated responsive to a process or portion thereof being faster than the fast outlier process 624 or portion thereof may indicate that there is likely an initialization problem (for instance, causing the process or portion thereof to fail to load a module). Embodiments are not limited in this context.

Figure 7:
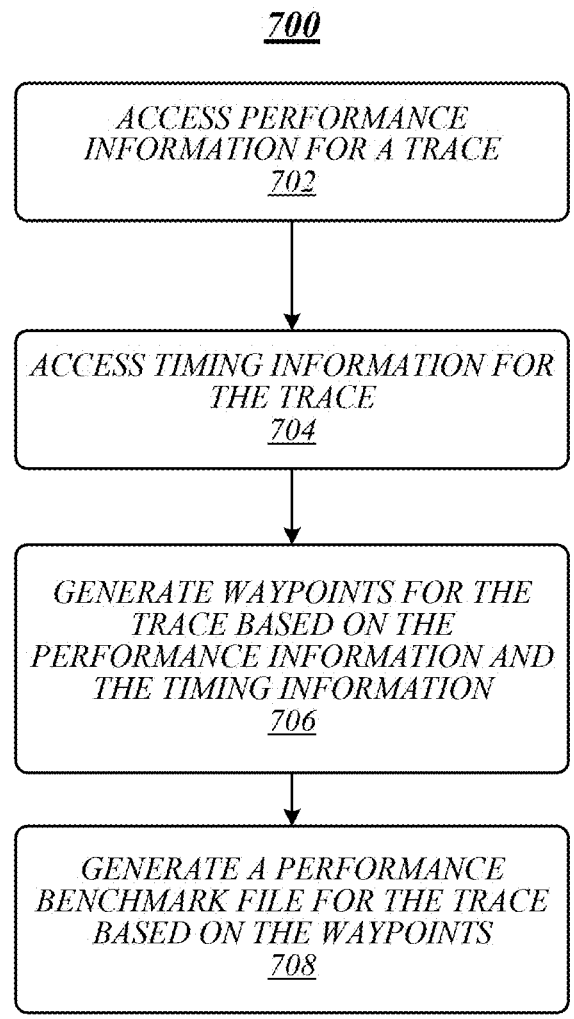
FIG. 7 illustrates an embodiment of a second logic flow.

FIG. 7 illustrates an embodiment of a logic flow 700. Logic flow 700 may be representative of some or all of the operations executed by one or more embodiments described herein, such as apparatus 105, 205, and/or 305. In some embodiments, logic flow 700 may be representative of some or all of the operations of a performance analysis process.

Logic flow 700 may access performance information for a trace at block 702. For example, performance benchmark generator logic 132 may access performance information 144a-n for a trace associated with apparatus 105, such as a BIOS boot process or a driver initialization routine. At block 704, logic flow may access timing information for the trace. For example, trace aggregator 322 may receive trace messages associated with the trace and corresponding timing information 344. Logic flow 700 may generate waypoints for the trace based on the trace information and the performance information and the timing information at block 706. For example, performance benchmark generator logic 332 may generate waypoints 350. At block 708, logic flow 700 may generate a performance benchmark file for the trace based on the waypoints. For example, performance benchmark generator logic 332 may generate standard benchmark information 346 for the trace.

Figure 8:
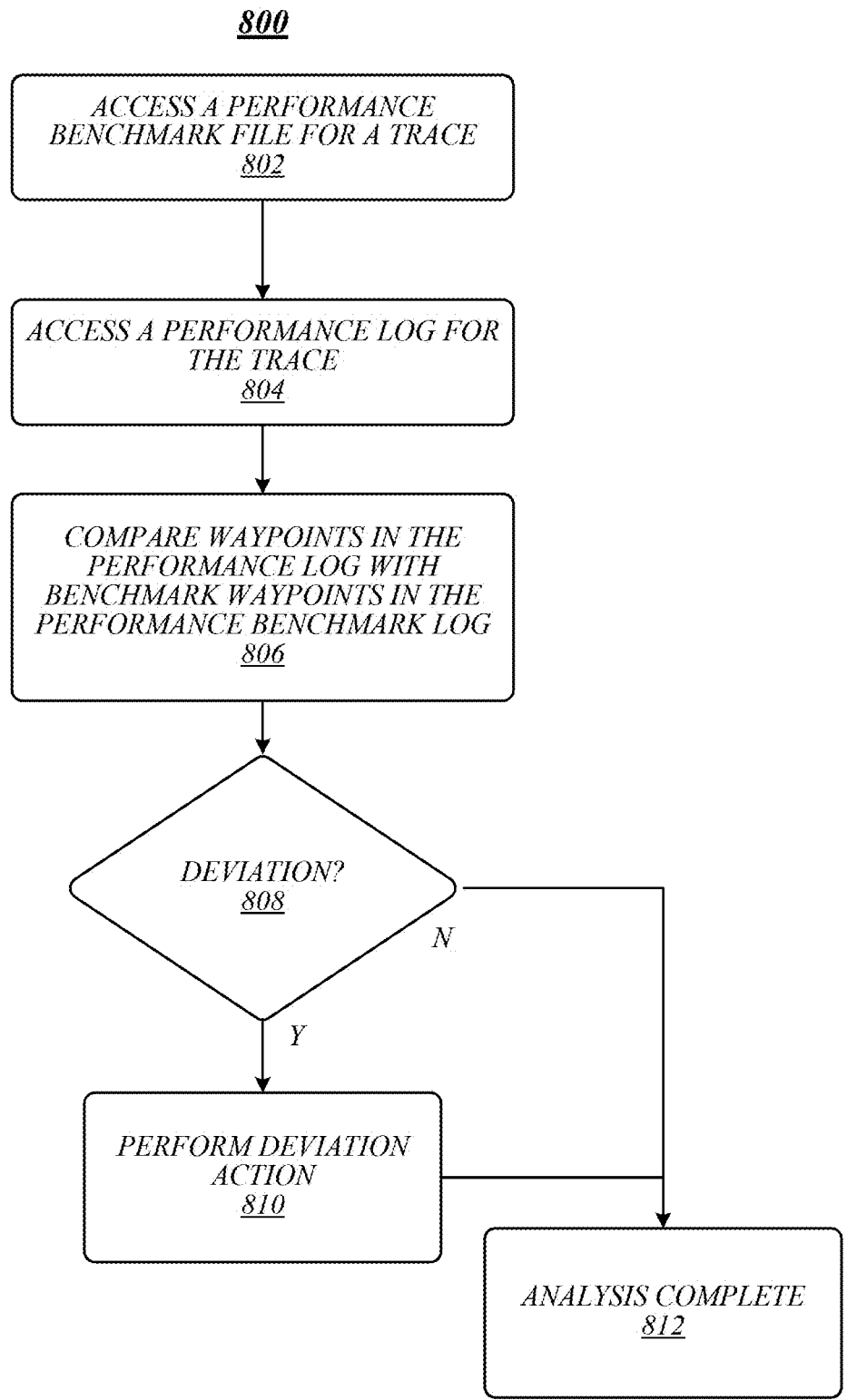
FIG. 8 illustrates an embodiment of a third logic flow.

FIG. 8 illustrates an embodiment of a logic flow 800. Logic flow 800 may be representative of some or all of the operations executed by one or more embodiments described herein, such as apparatus 105, 205, and/or 305. In some embodiments, logic flow 800 may be representative of some or all of the operations of a performance analysis process.

Logic flow 800 may access a performance benchmark file for a trace at block 802. For example, performance analysis logic 134 may access performance benchmark information 146a-n for a trace, such as a BIOS boot process. At block 804, logic flow 800 may access a performance log for the trace. For example, performance analysis logic 134 may access performance information 144a-n generated as a result of executing the trace. Logic flow 800 may compare waypoints in the performance log with benchmark waypoints in the performance benchmark log at block 806. For example, performance analysis logic 134 may determine whether actual time stamps for steps of the trace generated during execution of the trace match with expected time stamps for corresponding steps of benchmark waypoints in the performance benchmark log.

At block 808, logic flow 800 may determine whether there is a deviation between a waypoint in the performance log with a corresponding waypoint in the performance benchmark log. For example, performance analysis logic 134 may determine whether there is a deviation between a time stamp of a performance log waypoint and a corresponding time stamp of a performance benchmark log waypoint that is outside of a deviation threshold. Logic flow 800 may trigger a deviation action at block 810 responsive to determining that there is a deviation at block 808. For example, performance analysis logic 134 may generate an alert to an OS of apparatus 105, record the deviation in a deviation log, send a message to firmware associated with the trace, and/or the like. At block 812, logic flow 800 may complete the analysis of the trace.

Figure 9:
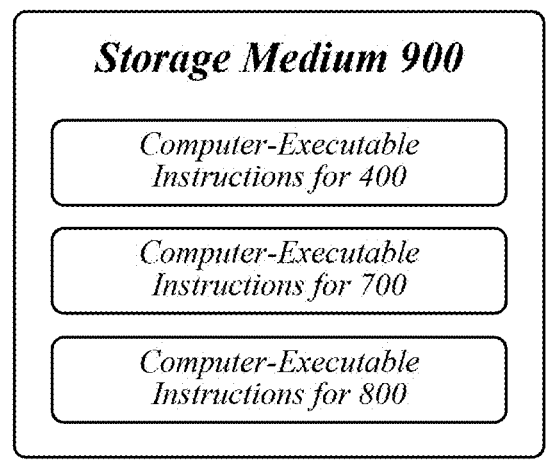
FIG. 9 illustrates an example of a storage medium.

FIG. 9 illustrates an example of a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 400, 700, and/or 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
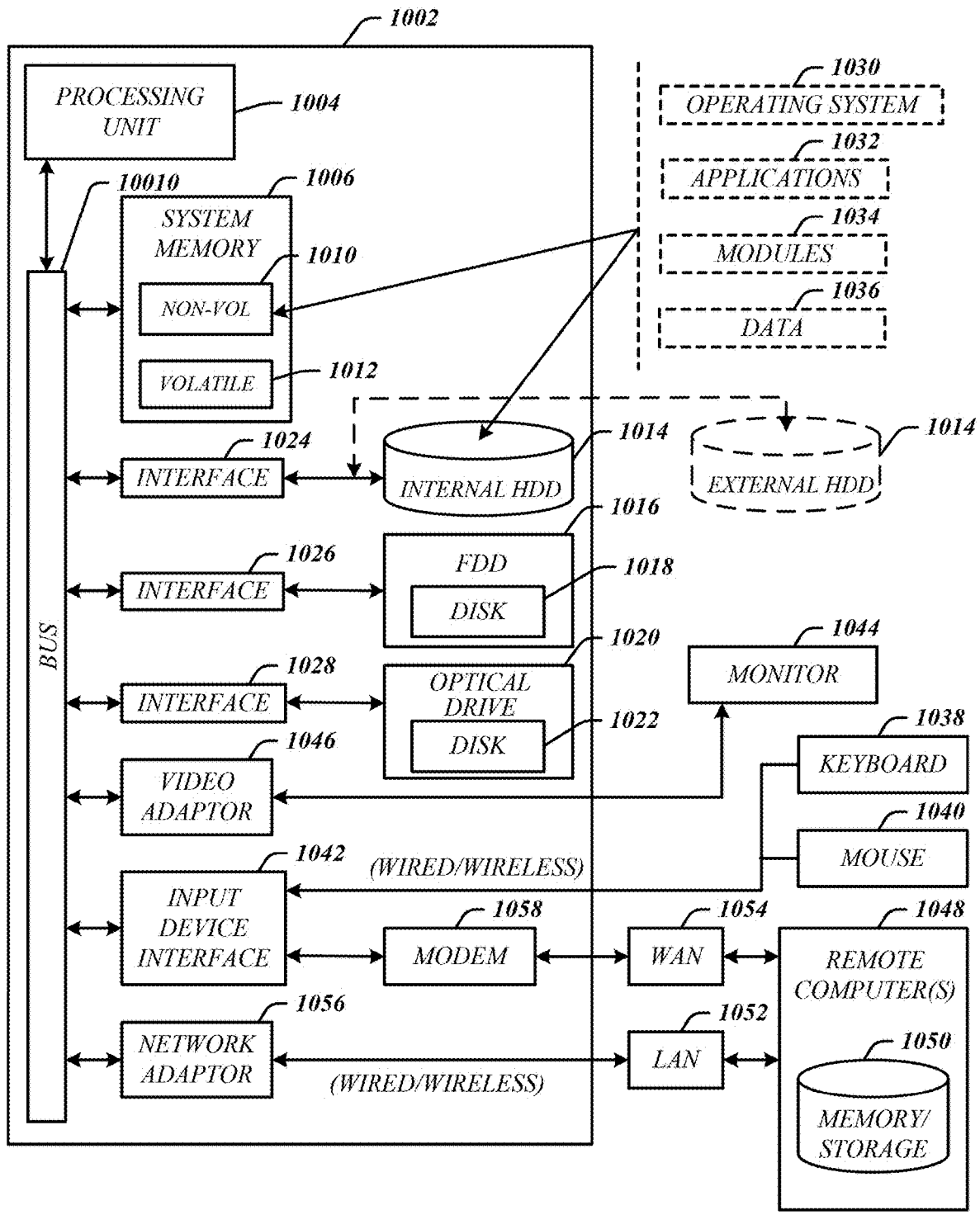
FIG. 10 illustrates an embodiment of a computing architecture.

FIG. 10 illustrates an embodiment of an exemplary computing architecture 1000 suitable for implementing various embodiments as previously described. In various embodiments, the computing architecture 1000 may comprise or be implemented as part of an electronic device. In some embodiments, the computing architecture 1000 may be representative, for example, of apparatus 105, 205, and/or 305. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of apparatus 105, 205, and/or 305.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1384 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following are non-limiting example embodiments:

Example 1 is an apparatus, comprising at least one memory, and logic coupled to the at least one memory, wherein the logic is to access at least one trace associated with at least one trace source, access timing information associated with the at least one trace, generate a plurality of waypoints for the at least one trace, each of the plurality of waypoints comprising a step of the at least one trace and a time stamp, and generate at least one performance benchmark log for the at least one trace, the at least one benchmark log comprising a plurality of benchmark waypoints corresponding to the plurality of waypoints.

Example 2 is the apparatus of Example 1, wherein the at least one trace source comprises one of a software source, a hardware source, or a firmware source.

Example 3 is the apparatus of Example 1, wherein the at least one trace source comprises a startup process.

Example 4 is the apparatus of Example 1, wherein the at least one trace source comprises a BIOS startup process.

Example 5 is the apparatus of Example 1, wherein the logic is further to generate a plurality of performance benchmark logs for the at least one trace, each of the plurality of performance benchmark logs comprising a plurality of benchmark waypoints determined based on an environmental context.

Example 6 is the apparatus of Example 1, wherein the logic is further to generate a plurality of performance benchmark logs for the at least one trace, each of the plurality of performance benchmark logs comprising a plurality of benchmark waypoints determined based on an environmental context, the environmental context comprising at least one of temperature, battery level, processor utilization, or memory utilization.

Example 7 is the apparatus of Example 1, wherein the logic is further to generate a plurality of performance benchmark logs for the at least one trace, each of the plurality of performance benchmark logs comprising a plurality of benchmark waypoints determined based on a configuration context.

Example 8 is the apparatus of Example 1, wherein the logic is further to generate a plurality of performance benchmark logs for the at least one trace, each of the plurality of performance benchmark logs comprising a plurality of benchmark waypoints determined based on a configuration context, the configuration context comprising a configuration of at least one of firmware, software, or hardware.

Example 9 is the apparatus of Example 1, wherein the logic is further to aggregate a plurality of traces in a trace collector, the trace collector comprising at least one of a trace aggregator or the at least one memory.

Example 10 is the apparatus of Example 1, wherein the logic is further to determine a deviation by comparing the plurality of waypoints to the plurality of benchmark waypoints.

Example 11 is the apparatus of Example 1, wherein the logic is further to initiate a deviation action responsive to determining a deviation via comparing the plurality of waypoints to the plurality of benchmark waypoints.

Example 12 is the apparatus of Example 1, wherein the logic is further to determine a deviation based on a trace timestamp of one of the plurality of waypoints deviating from a benchmark timestamp of a corresponding benchmark waypoint.

Example 13 is the apparatus of Example 1, wherein the logic is further to determine a deviation based on a measured resource value.

Example 14 is the apparatus of Example 1, wherein the logic is further to determine a measured resource value, and store the measured resource value in the at least one benchmark log.

Example 15 is a system, comprising the apparatus according to any of Examples 1-14, and at least one network interface.

Example 16 is a method, comprising accessing at least one trace associated with at least one trace source of a computing device, accessing timing information associated with the at least one trace, generating a plurality of waypoints for the at least one trace, each of the plurality of waypoints comprising a step of the at least one trace and a time stamp, and generating at least one performance benchmark log for the at least one trace, the at least one benchmark log comprising a plurality of benchmark waypoints corresponding to the plurality of waypoints.

Example 17 is the method of Example 16, wherein the at least one trace source comprises one of a software source, a hardware source, or a firmware source.

Example 18 is the method of Example 16, wherein the at least one trace source comprises a startup process.

Example 19 is the method of Example 16, wherein the at least one trace source comprises a BIOS startup process.

Example 20 is the method of Example 16, further comprising generating a plurality of performance benchmark logs for the at least one trace, each of the plurality of performance benchmark logs comprising a plurality of benchmark waypoints determined based on an environmental context.

Example 21 is the method of Example 16, further comprising generating a plurality of performance benchmark logs for the at least one trace, each of the plurality of performance benchmark logs comprising a plurality of benchmark waypoints determined based on an environmental context, the environmental context comprising at least one of temperature, battery level, processor utilization, or memory utilization.

Example 22 is the method of Example 16, further comprising generating a plurality of performance benchmark logs for the at least one trace, each of the plurality of performance benchmark logs comprising a plurality of benchmark waypoints determined based on a configuration context.

Example 23 is the method of Example 16, further comprising generating a plurality of performance benchmark logs for the at least one trace, each of the plurality of performance benchmark logs comprising a plurality of benchmark waypoints determined based on a configuration context, the configuration context comprising a configuration of at least one of firmware, software, or hardware.

Example 24 is the method of Example 16, further comprising aggregating a plurality of traces in a trace collector, the trace collector comprising at least one of a trace aggregator or the at least one memory.

Example 25 is the method of Example 16, further comprising determining a deviation by comparing the plurality of waypoints to the plurality of benchmark waypoints.

Example 26 is the method of Example 16, further comprising initiating a deviation action responsive to determining a deviation via comparing the plurality of waypoints to the plurality of benchmark waypoints.

Example 27 is the method of Example 16, further comprising determining a deviation by comparing the plurality of waypoints to the plurality of benchmark waypoints, the deviation based on a trace timestamp of one of the plurality of waypoints deviating from a benchmark timestamp of a corresponding benchmark waypoint.

Example 28 is the method of Example 16, further comprising determining a deviation based on a measured resource value.

Example 29 is the method of Example 16, further comprising determining a measured resource value, and storing the measured resource value in the at least one benchmark log.

Example 30 is a non-transitory computer-readable storage medium that stores computer-executable instructions for execution by processing circuitry of a computing device, the computer-executable instructions, when executed, to cause the computing device to access at least one trace associated with at least one trace source, access timing information associated with the at least one trace, generate a plurality of waypoints for the at least one trace, each of the plurality of waypoints comprising a step of the at least one trace and a time stamp, and generate at least one performance benchmark log for the at least one trace, the at least one benchmark log comprising a plurality of benchmark waypoints corresponding to the plurality of waypoints.

Example 31 is the non-transitory computer-readable storage medium of Example 30, wherein the at least one trace source comprises one of a software source, a hardware source, or a firmware source.

Example 32 is the non-transitory computer-readable storage medium of Example 30, wherein the at least one trace source comprises a startup process.

Example 33 is the non-transitory computer-readable storage medium of Example 30, wherein the at least one trace source comprises a BIOS startup process.

Example 34 is the non-transitory computer-readable storage medium of Example 30, the computer-executable instructions, when executed, to further cause the computing device to generate a plurality of performance benchmark logs for the at least one trace, each of the plurality of performance benchmark logs comprising a plurality of benchmark waypoints determined based on an environmental context.

Example 35 is the non-transitory computer-readable storage medium of Example 30, the computer-executable instructions, when executed, to further cause the computing device to generate a plurality of performance benchmark logs for the at least one trace, each of the plurality of performance benchmark logs comprising a plurality of benchmark waypoints determined based on an environmental context, the environmental context comprising at least one of temperature, battery level, processor utilization, or memory utilization.

Example 36 is the non-transitory computer-readable storage medium of Example 30, the computer-executable instructions, when executed, to further cause the computing device to generate a plurality of performance benchmark logs for the at least one trace, each of the plurality of performance benchmark logs comprising a plurality of benchmark waypoints determined based on a configuration context.

Example 37 is the non-transitory computer-readable storage medium of Example 30, the computer-executable instructions, when executed, to further cause the computing device to generate a plurality of performance benchmark logs for the at least one trace, each of the plurality of performance benchmark logs comprising a plurality of benchmark waypoints determined based on a configuration context, the configuration context comprising a configuration of at least one of firmware, software, or hardware.

Example 38 is the non-transitory computer-readable storage medium of Example 30, the computer-executable instructions, when executed, to further cause the computing device to aggregate a plurality of traces in a trace collector, the trace collector comprising at least one of a trace aggregator or the at least one memory.

Example 39 is the non-transitory computer-readable storage medium of Example 30, the computer-executable instructions, when executed, to further cause the computing device to determine a deviation by comparing the plurality of waypoints to the plurality of benchmark waypoints.

Example 40 is the non-transitory computer-readable storage medium of Example 30, the computer-executable instructions, when executed, to further cause the computing device to initiate a deviation action responsive to determining a deviation via comparing the plurality of waypoints to the plurality of benchmark waypoints.

Example 41 is the non-transitory computer-readable storage medium of Example 30, the computer-executable instructions, when executed, to further cause the computing device to determine a deviation by comparing the plurality of waypoints to the plurality of benchmark waypoints, the deviation based on a trace timestamp of one of the plurality of waypoints deviating from a benchmark timestamp of a corresponding benchmark waypoint.

Example 42 is the non-transitory computer-readable storage medium of Example 30, the computer-executable instructions, when executed, to further cause the computing device to determine a deviation based on a measured resource value.

Example 43 is the non-transitory computer-readable storage medium of Example 30, the computer-executable instructions, when executed, to further cause the computing device to determine a measured resource value, and store the measured resource value in the at least one benchmark log.

Example 44 is an apparatus, comprising at least one trace information means to access at least one trace associated with at least one trace source, and access timing information associated with the at least one trace, at least one performance information means to generate a plurality of waypoints for the at least one trace, each of the plurality of waypoints comprising a step of the at least one trace and a time stamp, and generate at least one performance benchmark log for the at least one trace, the at least one benchmark log comprising a plurality of benchmark waypoints corresponding to the plurality of waypoints.

Example 45 is the apparatus of Example 44, the at least one trace source comprising one of a software source, a hardware source, or a firmware source.

Example 46 is the apparatus of Example 44, the at least one trace source comprising a startup process.

Example 47 is the apparatus of Example 44, the at least one trace source comprising a BIOS startup process.

Example 48 is the apparatus of Example 44, the at least one performance information means to generate a plurality of performance benchmark logs for the at least one trace, each of the plurality of performance benchmark logs comprising a plurality of benchmark waypoints determined based on an environmental context.

Example 49 is the apparatus of Example 44, the at least one performance information means to generate a plurality of performance benchmark logs for the at least one trace, each of the plurality of performance benchmark logs comprising a plurality of benchmark waypoints determined based on an environmental context, the environmental context comprising at least one of temperature, battery level, processor utilization, or memory utilization.

Example 50 is the apparatus of Example 44, the at least one performance information means to generate a plurality of performance benchmark logs for the at least one trace, each of the plurality of performance benchmark logs comprising a plurality of benchmark waypoints determined based on a configuration context.

Example 51 is the apparatus of Example 44, the at least one performance information means to generate a plurality of performance benchmark logs for the at least one trace, each of the plurality of performance benchmark logs comprising a plurality of benchmark waypoints determined based on a configuration context, the configuration context comprising a configuration of at least one of firmware, software, or hardware.

Example 52 is the apparatus of Example 44, the at least one trace information means to aggregate a plurality of traces in a trace collector, the trace collector comprising at least one of a trace aggregator or the at least one memory.

Example 53 is the apparatus of Example 44, comprising a performance evaluation means to determine a deviation by comparing the plurality of waypoints to the plurality of benchmark waypoints.

Example 54 is the apparatus of Example 44, comprising a performance evaluation means to initiate a deviation action responsive to determining a deviation via comparing the plurality of waypoints to the plurality of benchmark waypoints.

Example 55 is the apparatus of Example 44, the comprising a performance evaluation means to determine a deviation by comparing the plurality of waypoints to the plurality of benchmark waypoints, the deviation based on a trace timestamp of one of the plurality of waypoints deviating from a benchmark timestamp of a corresponding benchmark waypoint.

Example 56 is the apparatus of Example 44, the comprising a performance evaluation means to determine a deviation based on a measured resource value.

Example 57 is the apparatus of Example 44, the at least one performance information means to determine a measured resource value, and store the measured resource value in the at least one benchmark log.

Example 58 is a system, comprising the apparatus according to any of Examples 44-58, and at least one network interface.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   at least one memory; and
   logic coupled to the at least one memory, with at least a portion of the logic implemented in circuitry, wherein the logic is further to:
      aggregate traces from a plurality of trace sources,
      access at least one trace associated with at least one trace source,
      access timing information associated with the at least one trace,
      generate a plurality of waypoints for the at least one trace, each of the plurality of waypoints comprising a step of the at least one trace and a time stamp, and
      generate at least one performance benchmark log for the at least one trace, the at least one benchmark log comprising a plurality of benchmark waypoints corresponding to the plurality of waypoints, the plurality of benchmark waypoints determined based on an environmental context, the environmental context comprising a temperature, a battery level, a processor utilization or a memory utilization.

2. The apparatus of claim 1, wherein the at least one trace source comprises one of a software source, a hardware source, or a firmware source.

3. The apparatus of claim 1, wherein the at least one trace source comprises a startup process.

4. The apparatus of claim 1, wherein the logic is further to generate a plurality of performance benchmark logs for the at least one trace, each of the plurality of performance benchmark logs comprising a plurality of benchmark waypoints determined based on a configuration context.

5. The apparatus of claim 1, wherein the logic is further to determine a deviation by comparing the plurality of waypoints to the plurality of benchmark waypoints.

6. The apparatus of claim 5, wherein the deviation is based on a trace timestamp of one of the plurality of waypoints deviating from a benchmark timestamp of a corresponding benchmark waypoint.

7. The apparatus of claim 1, wherein the logic is further to initiate a deviation action responsive to determining a deviation via comparing the plurality of waypoints to the plurality of benchmark waypoints.

8. The apparatus of claim 1, wherein the logic is further to determine a deviation based on a measured resource value.

9. The apparatus of claim 1, wherein the logic is further to:
   determine a measured resource value, and
   store the measured resource value in the at least one benchmark log.

10. A method, comprising:
    aggregating traces from a plurality of trace sources of a computing device;
    accessing at least one trace associated with at least one trace source of the computing device;
    accessing timing information associated with the at least one trace;
    generating a plurality of waypoints for the at least one trace, each of the plurality of waypoints comprising a step of the at least one trace and a time stamp; and
    generating at least one performance benchmark log for the at least one trace, the at least one benchmark log comprising a plurality of benchmark waypoints corresponding to the plurality of waypoints, the plurality of benchmark waypoints determined based on an environmental context, the environmental context comprising a temperature, a battery level, a processor utilization or a memory utilization.

11. The method of claim 10, wherein the at least one trace source comprises one of a software source, a hardware source, or a firmware source.

12. The method of claim 10, wherein the at least one trace source comprises a startup process.

13. The method of claim 10, further comprising generating a plurality of performance benchmark logs for the at least one trace, each of the plurality of performance benchmark logs comprising a plurality of benchmark waypoints determined based on a configuration context.

14. The method of claim 10, further comprising determining a deviation by comparing the plurality of waypoints to the plurality of benchmark waypoints.

15. The method of claim 10, further comprising initiating a deviation action responsive to determining a deviation via comparing the plurality of waypoints to the plurality of benchmark waypoints.

16. The method of claim 15, wherein the deviation is based on a trace timestamp of one of the plurality of waypoints deviating from a benchmark timestamp of a corresponding benchmark waypoint.

17. The method of claim 10, further comprising determining a deviation based on a measured resource value.

18. The method of claim 10, further comprising:
    determining a measured resource value; and
    storing the measured resource value in the at least one benchmark log.

19. A non-transitory computer-readable storage medium that stores computer-executable instructions for execution by processing circuitry of a computing device, the computer-executable instructions, when executed, to further cause the computing device to:
    aggregate traces from a plurality of trace sources in a trace collector, the trace collector comprising at least one of a trace aggregator or at least one memory;
    access at least one trace associated with at least one trace source;
    access timing information associated with the at least one trace;

generate a plurality of waypoints for the at least one trace, each of the plurality of waypoints comprising a step of the at least one trace and a time stamp; and generate at least one performance benchmark log for the at least one trace, the at least one benchmark log comprising a plurality of benchmark waypoints corresponding to the plurality of waypoints, the plurality of benchmark waypoints determined based on an environmental context, the environmental context comprising a temperature, a battery level, a processor utilization or a memory utilization.

20. The non-transitory computer-readable storage medium of claim 19, the computer-executable instructions, when executed, to further cause the computing device to determine a deviation by comparing the plurality of waypoints to the plurality of benchmark waypoints.

21. The non-transitory computer-readable storage medium of claim 19, the computer-executable instructions, when executed, to further cause the computing device to determine a deviation by deviation based on a trace timestamp of one of the plurality of waypoints deviating from a benchmark timestamp of a corresponding benchmark waypoint.

22. The non-transitory computer-readable storage medium of claim 19, the computer-executable instructions, when executed, to further cause the computing device to determine a deviation based on a measured resource value.

* * * * *